United States Patent
Choi et al.

(10) Patent No.: US 12,531,091 B2
(45) Date of Patent: Jan. 20, 2026

(54) STORAGE DEVICE FOR IDLE POWER OPERATION AND METHOD THEREFOR

(71) Applicant: Samsung Electronics Co., Ltd., Suwon-si (KR)

(72) Inventors: Dongkeon Choi, Suwon-si (KR); Kyung-Ho Shin, Suwon-si (KR); Jaesub Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 253 days.

(21) Appl. No.: 18/357,359

(22) Filed: Jul. 24, 2023

(65) Prior Publication Data

US 2024/0233780 A1    Jul. 11, 2024

(30) Foreign Application Priority Data

Jan. 9, 2023 (KR) .................. 10-2023-0002990

(51) Int. Cl.
*G11C 5/14* (2006.01)

(52) U.S. Cl.
CPC ........ *G11C 5/14* (2013.01); *G11C 2207/2227* (2013.01)

(58) Field of Classification Search
CPC ..... G11C 5/14; G11C 2207/2227; G11C 7/22; G06F 1/3275; G06F 13/1668; G06F 1/3206; G06F 1/324; G06F 1/3296; Y02D 10/00

USPC .......................................... 365/226
See application file for complete search history.

(56) References Cited

U.S. PATENT DOCUMENTS

| | | | |
|---|---|---|---|
| 8,156,287 B2 | 4/2012 | Bose et al. | |
| 9,037,888 B2 | 5/2015 | Kurihara et al. | |
| 9,378,536 B2 | 6/2016 | Park et al. | |
| 9,606,916 B2 | 3/2017 | Lee et al. | |
| 9,753,661 B2 | 9/2017 | Alcantara et al. | |
| 11,385,811 B2* | 7/2022 | Jung | G06F 3/0679 |
| 2014/0115315 A1* | 4/2014 | Ratn | G06F 9/4401 |
| | | | 713/2 |
| 2020/0125157 A1 | 4/2020 | Kachare et al. | |
| 2023/0131586 A1* | 4/2023 | Pedersen | G06F 1/3296 |
| | | | 713/320 |
| 2024/0029764 A1* | 1/2024 | Park | G11C 5/147 |

FOREIGN PATENT DOCUMENTS

KR     101047540 B1    7/2011

* cited by examiner

*Primary Examiner* — Huan Hoang

(74) *Attorney, Agent, or Firm* — Harness, Dickey & Pierce, P.L.C.

(57) ABSTRACT

Disclosed is a storage device capable of dynamically operating idle power in consideration of a workload type and an operating method therefor.

20 Claims, 9 Drawing Sheets

FIG. 5

| Workload Type | Controlled Unit (IP/Core/...) | GR |
|---|---|---|
| Type 1 | Core2 | GR1-1 |
| | Core3 | GR1-2 |
| | IP1 | GR1-3 |
| | ... | ... |
| | IPn | GR1-4 |
| | Bus | GR1-5 |
| Type 2 | Core2 | GR2-1 |
| | Core3 | GR2-2 |
| | IP1 | Normal |
| | ... | ... |
| | IPn | GR2-3 |
| | Bus | GR2-4 |

Mapping Table — 1113

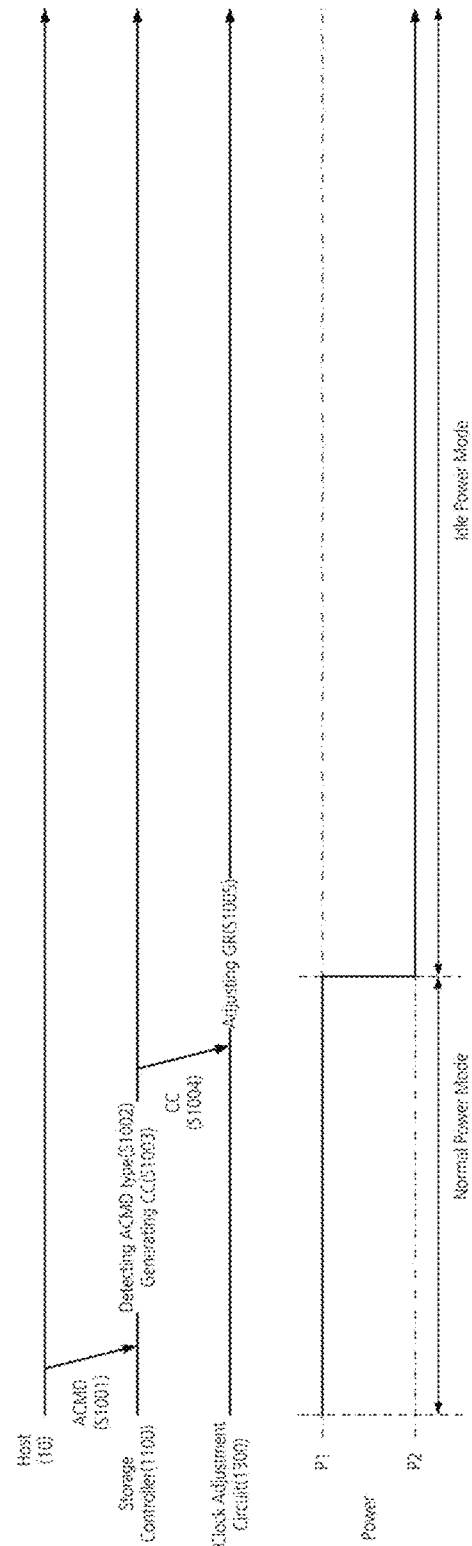

STORAGE DEVICE FOR IDLE POWER OPERATION AND METHOD THEREFOR

CROSS-REFERENCE TO RELATED APPLICATIONS

This application claims priority under 35 U.S.C. § 119 to Korean Patent Application No. 10-2023-0002990 filed on Jan. 9, 2023, in the Korean Intellectual Property Office, the disclosures of which are incorporated by reference herein in their entireties.

BACKGROUND

Example embodiments of the present disclosure described herein relate to storage devices for idle power operation and operation methods therefor.

Storage devices may operate with idle power. The idle power may be variously required according to consumers as well as countries or standards, and the demand for lower idle power is gradually increasing. For example, some standards of European Union (EU) or Open Compute Project (OCP) may require 5 W as the idle power.

Regarding operation in the idle power, conventional storage devices statically determine entry into an idle power mode. For example, storage devices enter the idle power mode only when no command is requested for a specified time, or immediately exit the idle power mode when a command is requested. In particular, even in the case of commands with relatively low bandwidth or latency limitation, conventional storage devices have an issue in which power loss occurs since the storage devices forcibly escape from the idle power mode.

SUMMARY

Example embodiments of the present disclosure provide storage devices capable of dynamically operating idle power in consideration of a workload type and operating methods therefor.

According to some example embodiments of the present disclosure, a storage device including a non-volatile memory; a storage controller connected to the non-volatile memory, configured to operate in an idle power mode or normal power mode, receive an admin command from a host device while operating in the idle power mode, determine a workload type of the admin command, and generate a clock control signal for operating with an idle power based on a determination that operation is possible with the idle power required by the idle power mode with respect to the admin command based on the workload type; and a clock adjustment circuit configured to adjust a gear ratio of each of at least one clock signal among a plurality of clock signals for operating the storage device based on the clock control signal.

According to some example embodiments of the present disclosure, a storage controller included in a storage device, the storage controller including a workload type detector configured to determine a workload type of an admin command received from a host device while operating in an idle power mode; and a clock throttling unit configured to generate a clock control signal for operating with an idle power based on a determination that operation is possible with the idle power required by the idle power mode with respect to the admin command based on the workload type, determine a gear ratio of each of at least one clock signal among a plurality of clock signals for operating the storage device with reference to a mapping table, and generate the clock control signal based on the gear ratio.

According to some example embodiments of the present disclosure, a method of operating a storage device, the method including receiving an admin command from a host device while operating in an idle power mode; determining a workload type of the admin command; determining whether operation is possible with idle power required by the idle power mode with respect to the admin command based on the workload type; generating a clock control signal for operating with the idle power based on the determination that the operation is possible with the idle power; and adjusting a gear ratio of each of at least one clock signal among a plurality of clock signals for operating the storage device based on the clock control signal.

BRIEF DESCRIPTION OF THE FIGURES

A detailed description of each drawing is provided to facilitate a more thorough understanding of the drawings referenced in the detailed description of the present disclosure.

FIG. 5 illustrates a mapping table, according to some example embodiments of the present disclosure.

FIG. 7 is a diagram for describing an operation of a storage device, according to some example embodiments of the present disclosure.

DETAILED DESCRIPTION

Hereinafter, example embodiments of the present disclosure may be described for example and clearly to such an extent that an ordinary one in the art easily implements the present disclosure.

Figure 1:
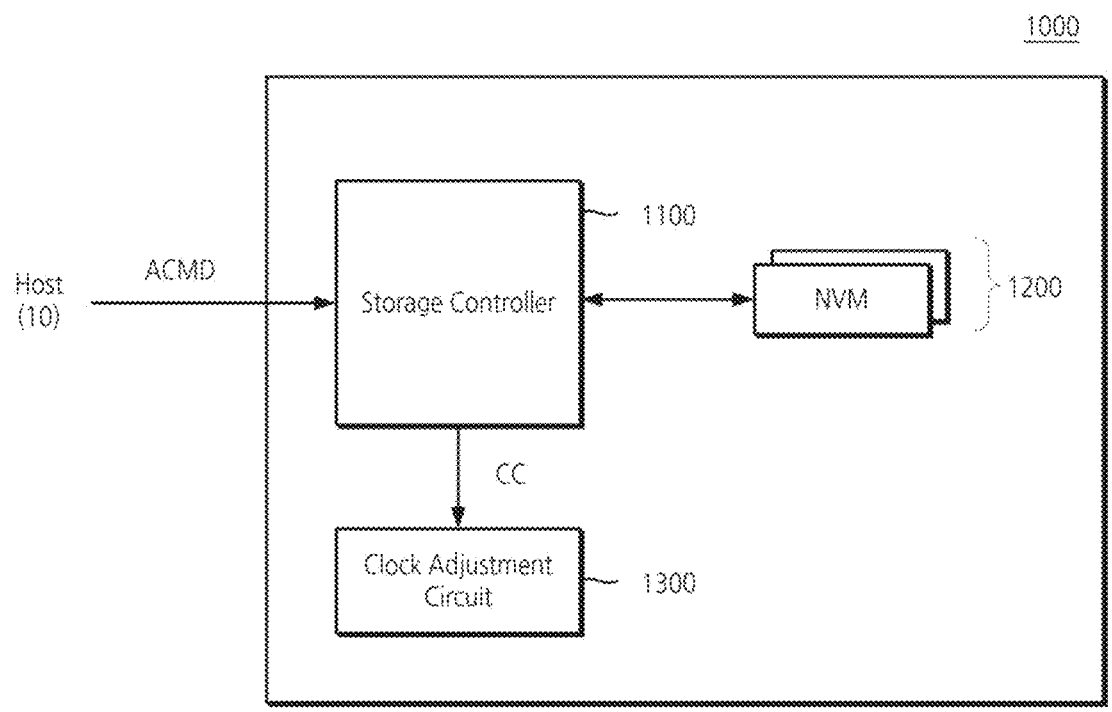
FIG. 1 illustrates a storage device, according to some example embodiments of the present disclosure.

FIG. 1 illustrates a storage device, according to some example embodiments of the present disclosure.

Referring to FIG. 1, a storage device 1000 according to some example embodiments may include a storage controller 1100, a non-volatile memory 1200, and a clock adjustment circuit 1300.

The storage device 1000 may receive a command from a host device 10 and may perform an operation according to the command through the non-volatile memory 1200. For example, the command may indicate a write operation, a read operation, an erase operation, or a flush operation. In this case, the flush operation may refer to an operation requesting to make data in a volatile write cache non-volatile.

Each command may include logical address information associated with the non-volatile memory 1200 in which an operation according to the command is performed. When a plurality of commands are transmitted from the host device 10, logical addresses of the commands may be sequential or random.

In some example embodiments, the storage device 1000 may be an SSD, a UFS or an eMMC. Alternatively, in some example embodiments, the storage device 1000 may be implemented with a Secure Digital (SD) card, a micro SD card, a memory stick, a chip card, a Universal Serial Bus (USB) card, a smart card, a Compact Flash (CF) card, or a form similar thereto, and is not limited to the above-described embodiments.

In some example embodiments, the storage device 1000 may be implemented in 3.5 inches, 2.5 inches, 1.8 inches, M.2, U.2, U.3, EDSFF (Enterprise and Data Center SSD Form Factor), NF1 (New Form Factor 1), and/or a form factor similar thereto.

In some example embodiments, the storage device 1000 may be implemented in a small computer system interface (SATA), a small computer system interface (SCSI), a serial attached SCSI (SAS), and/or an interface similar thereto, and may be implemented in a peripheral component interconnect (PCI), a PCI express (PCIe), a non-volatile Memory Express (NVMe), an NVMe-over-Fabrics (NVMe-oF), an Ethernet, an InfiniBand, a Fiber Channel, and/or a protocol similar thereto.

In some example embodiments, the storage device 1000 may operate in one of a normal power mode and an idle power mode. The normal power mode may refer to a mode operating with general storage operating power, not the idle power mode. The idle power mode may be referred to as a low-power mode or a power-save mode, and may refer to a mode in which the storage device 1000 operates with idle power lower than normal storage operating power. The idle power required by the idle power mode is lower than the normal power required by the normal power mode. In some example embodiments, the idle power may be less than 5 W.

The storage controller 1100 is connected to the non-volatile memory 1200 and controls overall operations of the storage device 1000 including the non-volatile memory 1200.

In some example embodiments, the storage controller 1100 may receive an admin command ACMD from the host device 10. The admin command ACMD defines commands that can be submitted to an admin submission queue SQ, and a completion response to the admin command ACMD may be stored in an admin completion queue CQ. The admin command ACMD may not be affected by a state of an I/O queue.

For example, the admin command ACMD may include various types of commands defined in the Non-Volatile Memory Express (NVMe) standard. The admin command ACMD may be defined based on an opcode.

In some example embodiments, the storage controller 1100 may determine a workload type of the received admin command ACMD. For example, the storage controller 1100 may determine a workload type based on at least one of a latency required for the admin command ACMD, an I/O amount of the non-volatile memory 1200, and a type of the admin command ACMD. In the case of the type of the admin command ACMD, the storage controller 1100 may determine the type of the admin command ACMD by referring to the opcode of the admin command ACMD.

When the storage device 1000 is performing an exceptional operation, the storage controller 1100 may not perform an operation to determine the type of the admin command ACMD including referring to the opcode with respect to the admin command ACMD. For example, the exceptional operation may be defined as an operation for which time constraints exist in operation processing, such as a reset or a power-on reset POR of the storage device 1000, or may be defined as an operation in which reception of the admin command ACMD or determine of the workload type for the admin command ACMD is difficult due to processing of the corresponding operation.

The storage controller 1100 may determine whether power optimization (for example, improvement of power usage and/or allocation) for operating in the above-described idle power mode is possible with respect to the admin command ACMD based on the determined workload type. The power optimization may mean enabling the storage device 1000 to operate in the idle power mode by optimizing or improving operating power by a workload according to the admin command ACMD. In more detail, in the present disclosure, the power optimization may mean that the storage device 1000 can operate with the idle power required by the idle power mode with respect to the admin command received from the host device 10.

For example, the storage controller 1100 may determine the workload type with respect to the admin command ACMD considering whether it is determined that the latency required for the admin command ACMD is relatively low and the possibility of time out occurrence is low, whether the input/output amount of the non-volatile memory 1200 is relatively low and operation is possible with low power, and whether it is difficult to operate with low power as the type of the admin command ACMD is accompanied by an erase operation, etc.

The storage controller 1100 may generate a clock control signal CC for power optimization when it is determined that the power optimization for the admin command ACMD is possible according to the determined workload type. The clock control signal CC is a signal for operating the storage device 1000 with the idle power required by the idle power mode. When the storage controller 1100 transmits the clock control signal CC to the clock adjustment circuit 1300, the clock adjustment circuit 1300 may perform the power optimization of the storage device 1000 according to the received clock control signal CC. In the present disclosure, an operation in which the storage controller 1100 dynamically generates the clock control signal CC according to a workload type and controls the clock adjustment circuit 1300 may be defined as clock signal throttling.

In some example embodiments, the storage controller 1100 may generate the clock control signal CC based on a predefined (or, alternatively, for example, desired or selected) mapping table for each workload type. The predefined (or, alternatively, for example, desired or selected) mapping table may define gear ratios associated with each of one or more cores and one or more intellectual properties (IPs) for each workload type. For example, the IP may include IP for automatically processing input/output between the storage controller 1100 and the non-volatile memory 1200 and various other IPs for driving the storage device 1000. The storage controller 1100 may generate the clock control signal CC for each of one or more cores and one or more IPs included in the storage device 1000.

Alternatively, the storage controller 1100 may operate in the normal power mode when it is determined that power optimization is impossible (for example, cannot be done, or does not provide a benefit) with respect to the admin command ACMD.

The non-volatile memory 1200 is controlled by the storage controller 1100. The non-volatile memory 1200 may store data transmitted from the host device 10, data generated by the storage device 1000, or other various data written by the storage controller 1100. In some example embodiments, the non-volatile memory 1200 may be any non-volatile memory such as a NAND flash memory, a PRAM (Phase Change Random Access Memory), an RRAM (Resistance Random Access Memory), an NFGM (Nano Floating Gate Memory), a PoRAM (Polymer Random Access Memory), an MRAM (Magnetic Random Access Memory), an FRAM (Ferroelectric Random Access Memory), etc., but is not limited thereto.

In some example embodiments, when the storage device 1000 operates in the idle power mode according to the storage controller 1100, the non-volatile memory 1200 may similarly operate in the idle power mode.

The clock adjustment circuit 1300 may receive the clock control signal CC from the storage controller 1100. The clock adjustment circuit 1300 may adjust a gear ratio of each of at least one clock signal among a plurality of clock signals for operating the storage device 1000 based on the clock control signal CC. The clock control signal CC may correspond to each of the one or more cores and the one or more IPs, and the clock adjustment circuit 1300 may adjust each of the plurality of clock signals for the operation of the one or more cores and the one or more IPs according to a gear ratio indicated the clock control signal CC. The clock adjustment operation based on gear ratios may have advantages in terms of granularity, for example, as the gear ratios may allow for an improved number of clock control options.

When it is determined that there is no need to adjust the clock signal being used for the operation of at least one of one or more cores and one or more IPs according to the workload type, the storage controller 1100 may allow at least one clock signal to be operated with a normal clock being used for operation. For example, according to the workload type, at least some of the one or more cores and one or more IPs determined to be necessary (or, for example, relevant, important, or beneficial) to operate with the normal clock may be operated with the normal clock.

The storage controller 1100 may perform the power optimization by adjusting a gear ratio of each clock signal for each of one or more cores and one or more IPs included in the storage device 1000 according to the above-described embodiments.

In some example embodiments, the storage controller 1100 may enter the idle power mode through power optimization for one or more cores and one or more IPs when it is determined that power optimization is possible during operation in the normal power mode. When entering the idle power mode, the storage device 1000 may operate with the idle power.

Alternatively, in some example embodiments, the storage controller 1100 may receive an additional admin command ACMD from the host device 10 while operating in the idle power mode. Then, the storage controller 1100 may determine the workload type of the additional admin command ACMD according to the above-described embodiments, and may determine whether power optimization is possible based on the workload type. When it is determined that the power optimization is possible with respect to the additional admin command ACMD, the storage controller 1100 may still maintain the idle power mode. For example, the storage controller 1100 does not exit the idle power mode when the additional admin command ACMD is received during the idle power mode, but may maintain the idle power mode as it is when it is determined that the power optimization is possible with respect to the corresponding additional admin command ACMD.

Alternatively, in some example embodiments, when the storage controller 1100 receives the additional admin command ACMD from the host device 10 after exiting the idle power mode, the storage controller 1100 may re-enter the idle power mode when it is determined that operation is possible with the idle power with respect to the additional admin command ACMD.

Alternatively, in some example embodiments, the storage controller 1100 and the clock adjustment circuit 1300 may perform the power optimization through a clock division operation of dividing the clock signal by N (where 'N' is a natural number). For example, the storage controller 1100 may generate the clock control signal CC indicating a clock division rate for each of one or more cores and one or more IPs. The clock adjustment circuit 1300 may control one or more cores and one or more IPs according to the indicated clock division rate.

According to the above-described embodiments, the storage device 1000 of the present disclosure may determine the workload type when receiving the admin command ACMD, and may enter the idle power mode when power optimization through clock adjustment is possible according to the workload type, or may maintain the idle power mode as it is when it is operating in the idle power mode without exiting the idle power mode. For example, by operating with a clock optimized for a workload, the present disclosure may enter the idle power mode instead of always operating in the normal power mode and may save power. In addition, the present disclosure may operate by extending the idle power mode to the maximum according to the workload type even when the admin command ACMD is received in the idle power mode, so power may be saved. As described above, there may be an effect of improving power consumption of the storage device 1000 by extending the idle power mode. Alternatively, or additionally, as described above, because the idle power mode may be extended, the storage device 1000 may be improved, for example based on increased reliability and durability based on lower power loads, improved power performance with improved processing performance, and/or the like.

Figure 2:
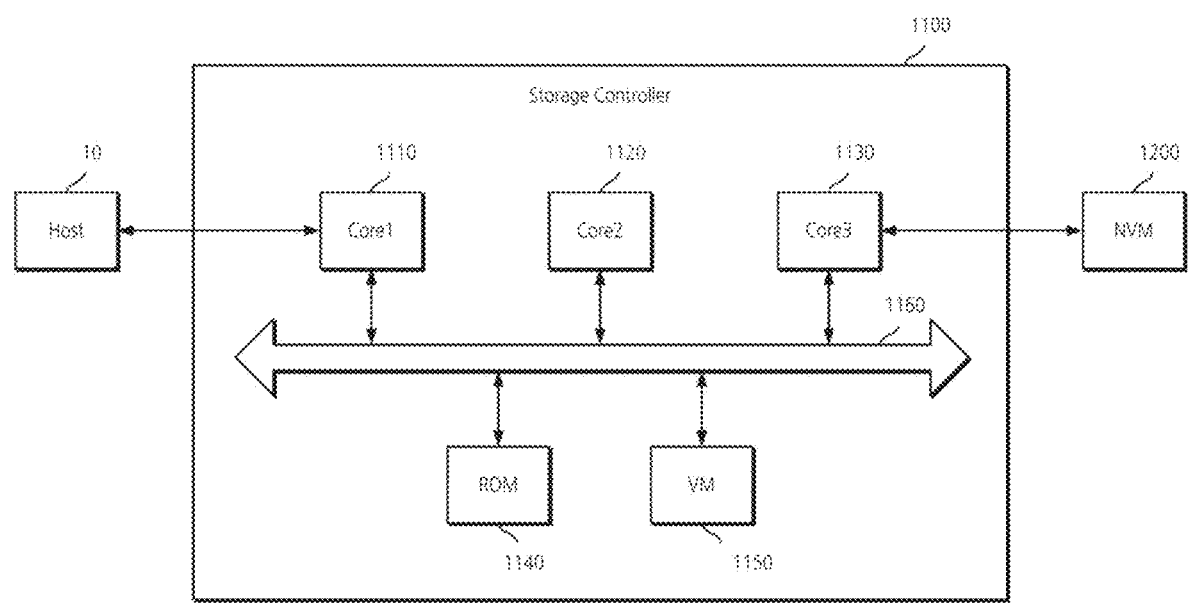
FIG. 2 illustrates a storage controller, according to some example embodiments of the present disclosure.

FIG. 2 illustrates a storage controller, according to some example embodiments of the present disclosure.

Referring to FIG. 2, the storage controller 1100 according to some example embodiments includes a first core 1110, a second core 1120, a third core 1130, a ROM 1140, a volatile memory 1150, and a bus 1160 which electrically connects the plurality of cores 1110, 1120, and 1130, the ROM 1140, and the volatile memory 1150 to one another.

Each of the plurality of cores 1110, 1120, and 1130 may be implemented as a separate processor core. The plurality of cores 1110, 1120, and 1130 may include the first core 1110, the second core 1120, and the third core 1130. The first core 1110 may be referred to as a host core, the second core 1120 may be referred to as a flash translation layer (FTL) core, and the third core 1130 may be referred to as a NAND core. However, example embodiments are not limited thereto, and for example, each of the cores 1110, 1120, and 1130 may represent a number of cores working separately or cooperatively, etc.

As will be described later, the first core 1110 may be defined as a core inside the storage device 1000 that performs an operation related to a host interface layer (HIL). For example, the first core 1110 may process a request including a command input from the host device 10. For example, the first core 1110 may perform an operation in which the storage controller 1100 according to the above-described embodiments determines the workload type of the admin command ACMD, an operation of determining whether power optimization is possible with respect to the admin command ACMD based on the workload type, an operation of generating the clock control signal CC for power optimization, etc. A detailed description of a specific operation of the first core 1110 will be described later.

The storage controller 1100 may be connected to the host device 10 through the first core 1110. The first core 1110 may provide an interface function between the storage device 1000 and the host device 10. Through the first core 1110, the storage device 1000 may receive various commands including the admin command ACMD, data to be written in the non-volatile memory 1200, or other data from the host device 10, or may transmit a response to a command, data read from the non-volatile memory 1200, or other data to the host device 10.

The second core 1120 may be defined as a core inside the storage device 1000 that performs operations related to the FTL. For example, the second core 1120 may control the third core 1130 based on a request received from the first core 1110 such that a read operation, a write operation, or an erase operation may be performed in the non-volatile memory 1200. Alternatively, the second core 1120 may perform an address mapping operation of mapping a logical block address (LBA) transmitted from the host device 10 to a physical block address (PBA) that indicates a physical location of the non-volatile memory 1200 using the FTL.

The third core 1130 may be defined as a core inside the storage device 1000 that performs operations related to a Flash Interface Layer (FIL). For example, the third core 1130 may perform operations on the non-volatile memory 1200 under the control of the second core 1120.

The storage controller 1100 is connected to the non-volatile memory 1200 through the third core 1130. The third core 1130 provides an interface function between the storage device 1000 and the non-volatile memory 1200. The storage device 1000 may transmit data to be written to the non-volatile memory 1200 or may receive data read from the non-volatile memory 1200 through the third core 1130. For example, the third core 1130 may perform LDPC (Low Density Parity Checker) encoding on data received from the host device 10 or data stored in the volatile memory to correct data errors. For example, the third core 1130 may store the encoded data in the volatile memory 1150 before storing the encoded data in the non-volatile memory 1200. For example, the third core 1130 may control an operation clock of the non-volatile memory 1200.

The ROM 1140 may store codes and data necessary (or, for example, relevant, important, or beneficial) for driving the storage controller 1100. The volatile memory 1150 may buffer and store write data transmitted from the host device 10 or read data transferred from the non-volatile memory 1200. In addition, codes and data necessary (or, for example, relevant, important, or beneficial) for driving the storage controller 1100 may be loaded into the volatile memory 1150 during an initialization or booting process of the storage device 1000. In some example embodiments, a predefined (or, alternatively, for example, desired or selected) mapping table may be stored in the ROM 1140 and/or the volatile memory 1150.

In FIG. 2, the ROM 1140 and the volatile memory 1150 are illustrated as being included in the storage controller 1100, but are not limited thereto. For example, the ROM 1140 and/or the volatile memory 1150 may be provided outside the storage controller 1100. For example, the volatile memory 1150 may be a dynamic random-access memory (DRAM) or a static random-access memory (SRAM).

The bus 1160 may electrically connect the plurality of cores 1110, 1120, and 1130, the ROM 1140, and the volatile memory 1150. For example, an advanced microcontroller bus architecture (AMBA) protocol proposed by the ARM company may be applied to the bus 1160. Bus types of the AMBA protocol may include an Advanced High-Performance Bus (AHB), an Advanced Peripheral Bus (APB), an AXI, an AXI4, and an ACE (AXI Coherency Extensions), but are not limited thereto. For example, the bus 1160 may be a Networks on Chip (NoC) bus.

Figure 3:
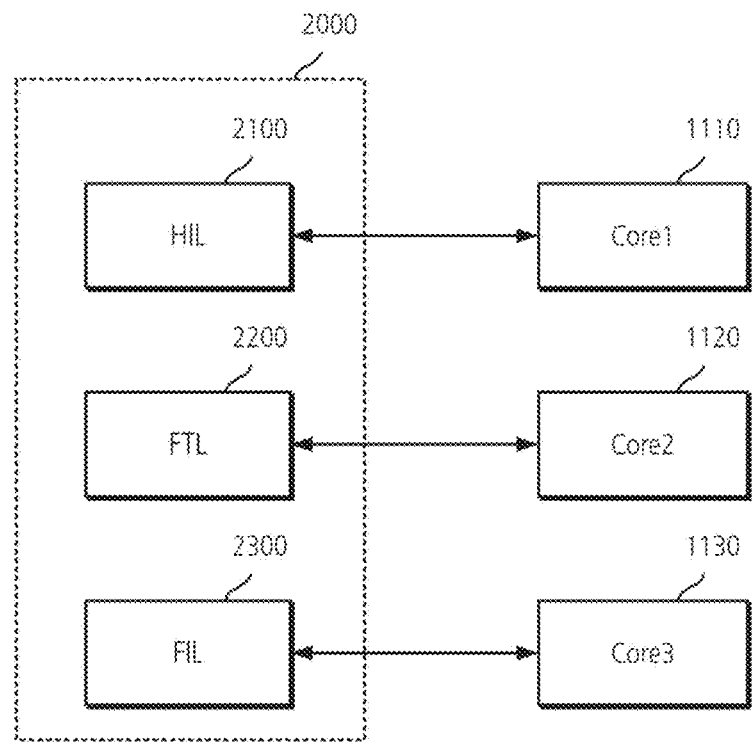
FIG. 3 is a diagram for describing a plurality of cores illustrated in FIG. 2.

FIG. 3 is a diagram for describing a plurality of cores illustrated in FIG. 2.

Referring to FIG. 3, software such as firmware of the storage device 1000 may have an HIL 2100, an FTL 2200, and a FIL 2300 in a hierarchical structure 2000.

As described above, the plurality of cores 1110, 1120, and 1130 include the first core 1110, the second core 1120, and the third core 1130, and each of which may control the HIL 2100, the FTL 2200, and the FIL 2300, respectively, which are the hierarchical structure 2000 of the software of the storage device 1000. For example, the first core 1110 may control an operation of receiving data from the host device 10 and storing the received data in the non-volatile memory 1200 using the HIL 2100. For example, the second core 1120 may perform an address mapping operation using the FTL 2200. For example, the third core 1130 may provide data stored in the ROM 1140 to the non-volatile memory 1200 using the FIL 2300.

Figure 4:
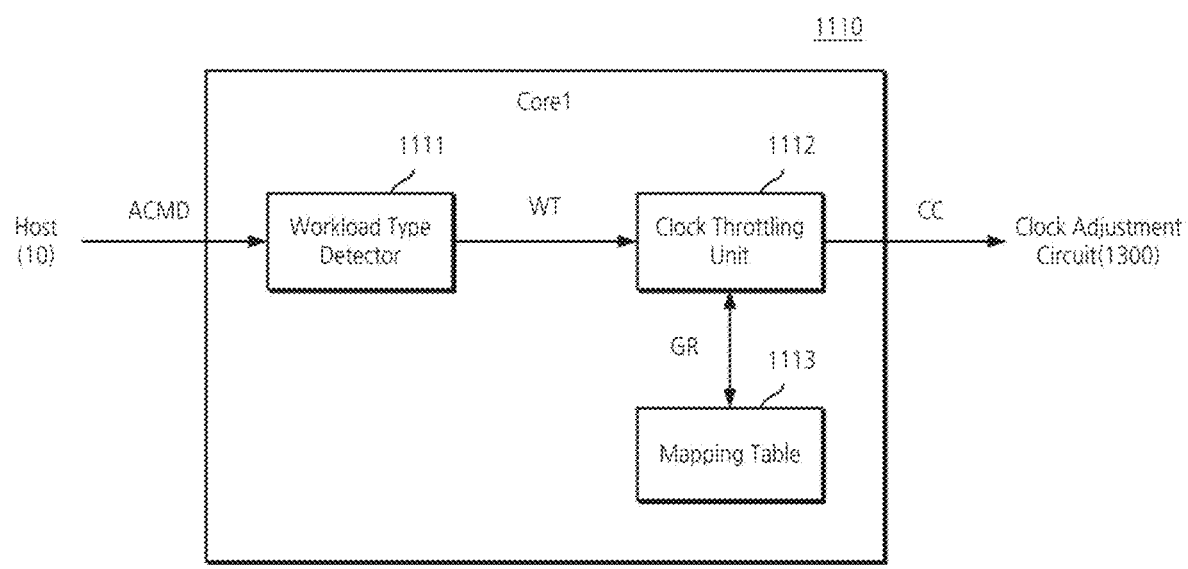
FIG. 4 illustrates a first core, according to some example embodiments of the present disclosure.

FIG. 4 illustrates a first core, according to some example embodiments of the present disclosure.

Referring to FIG. 4, the first core 1110 according to some example embodiments may include a workload type detector 1111 and a clock throttling unit 1112.

The workload type detector 1111 may check (or, alternatively, review, or determine) a workload type of the admin command ACMD received from the host device 10. The workload type detector 1111 may check (or, alternatively, review, or determine) the workload type based on at least one of a latency required for the admin command ACMD, an input/output amount of the non-volatile memory 1200 connected to the storage controller 1100, and a type of the admin command ACMD.

For example, the workload type detector 1111 may determine the workload type with respect to the admin command ACMD considering whether the admin command ACMD is the admin command ACMD without restrictions on the latency or input/output amount of the admin command ACMD, whether the type of admin command ACMD defined by the opcode field belongs to which type, etc.

In some example embodiments, the workload type detector 1111 may determine that the admin command ACMD that can be processed with a relatively low latency and input/output amount is a workload type capable of power optimization.

For example, an identify command among admin commands ACMD is a command defined to return a data buffer describing information on a subsystem, a domain, a controller, or a namespace of the non-volatile memory 1200. For example, since the identify command is a command for identifying identification information associated with the storage device 1000, the identify command may be processed with a relatively low latency and input/output amount. Accordingly, the workload type detector 1111 may determine that the workload type is capable of power optimization when it is determined that the received command is the identify command through the opcode.

For example, a Get Log Page command among the admin commands ACMD is a command defined to return a data buffer including a requested log page. The Get Log Page command may identify a log page to be searched through a Log Page Identifier (LID). For example, when the LID is 02h, SMART information for monitoring the storage device 1000 may be identified. For example, since the Get Log Page command to obtain a log page for the SMART information is a command to obtain monitoring information, the Get Log Page command may be processed with a relatively low latency and input/output amount. Accordingly, the workload type detector 1111 may determine that the workload type is capable of power optimization when it is determined that the received command is the Get Log Page command through the opcode.

For example, a keep alive command among the admin commands ACMD is a command used to determine whether the host or the storage device 1000 is operational. The host or storage device 1000 may be defined as being in operation when each is accessible and can issue or process a command. For example, since the keep alive command is an intermittent command for determining a state of the storage device 1000, the keep alive command may be processed with a relatively low latency and input/output amount. Accordingly, the workload type detector 1111 may determine that the workload type is capable of power optimization when it is determined that the received command is the keep alive command through the opcode.

In some example embodiments, the workload type detector 1111 may determine that an admin command ACMD which requires processing with a relatively high latency and input/output amount is a workload type for which power optimization is impossible.

For example, a format command among the admin commands ACMD is a command used to format NVM media at a low level. The format command may be used by the host device 10 to change attributes of NVM media. A low-level format may erase all namespaces or all data and/or metadata associated with a specific namespace. For example, since the format command involves erasing all data, the format command may require a relatively high latency and input/output amount. Accordingly, the workload type detector 1111 may determine that the workload type is one of which power optimization is not possible when it is determined that the received command is the format command through the opcode.

The workload type detector 1111 may determine the workload type of the admin command ACMD and may transfer the determined workload type information WT to the clock throttling unit 1112.

The clock throttling unit 1112 may generate the clock control signal CC when it is determined that power optimization for operating in the idle power mode is possible with respect to the admin command ACMD according to the workload type determined by the workload type detector 1111. In some example embodiments, the clock throttling unit 1112 may generate the clock control signal CC for each of one or more cores and one or more IPs included in the storage device 1000.

In some example embodiments, the clock throttling unit 1112 may determine a gear ratio GR of each of at least one clock signal among a plurality of clock signals for operating the storage device 1000 by referring to a predefined (or, alternatively, for example, desired or selected) mapping table 1113 and may generate the clock control signal CC based on the gear ratio GR. The clock throttling unit 1112 may transfer the generated clock control signal CC to the clock adjustment circuit 1300.

The predefined (or, alternatively, for example, desired or selected) mapping table 1113 may be defined for each workload type. For example, the predefined (or, alternatively, for example, desired or selected) mapping table 1113 may define the gear ratio GR for each of one or more cores and one or more IPs for each workload type. The clock throttling unit 1112 may determine the workload type in the mapping table 1113 and may determine the gear ratio GR for each of one or more cores and one or more IPs corresponding to the corresponding workload type. The clock throttling unit 1112 may generate a control signal to operate one or more cores and one or more IPs according to the determined gear ratio GR.

In some example embodiments, the predefined (or, alternatively, for example, desired or selected) mapping table 1113 may be differently defined or updated according to values of the idle power required in the idle power mode.

FIG. 5 illustrates a mapping table according to some example embodiments of the present disclosure.

Referring to FIG. 5, the predefined (or, alternatively, for example, desired or selected) mapping table 1113 may define gear ratios for each workload type, one or more cores corresponding to the workload type, and one or more IPs corresponding to the workload type, as illustrated. For example, when it is determined that the workload type is type 1, the clock throttling unit 1112 may generate the clock control signal CC indicating that a second core and a third core operate at a 1-1 gear ratio and a 1-2 gear ratio, respectively. In addition, the clock throttling unit 1112 may determine gear ratios for each of the first IP to n-th IP, and may also determine gear ratios (for example, $1^{st}$ to $5^{th}$ gear ratios) for optimizing or improving driving power of buses for driving the storage device 1000.

For example, when it is determined that the workload type is type 2, the clock throttling unit 1112 may similarly refer to gear ratios corresponding to the corresponding workload type through the predefined (or, alternatively, for example, desired or selected) mapping table 1113. For example, in the predefined (or, alternatively, for example, desired or selected) mapping table 1113, some Ips (a first IP) such as type 2 may be defined to operate as the normal clock in operation. Accordingly, at least some of the one or more cores and the one or more Ips may operate with the normal clock according to the workload type.

Figure 6A:
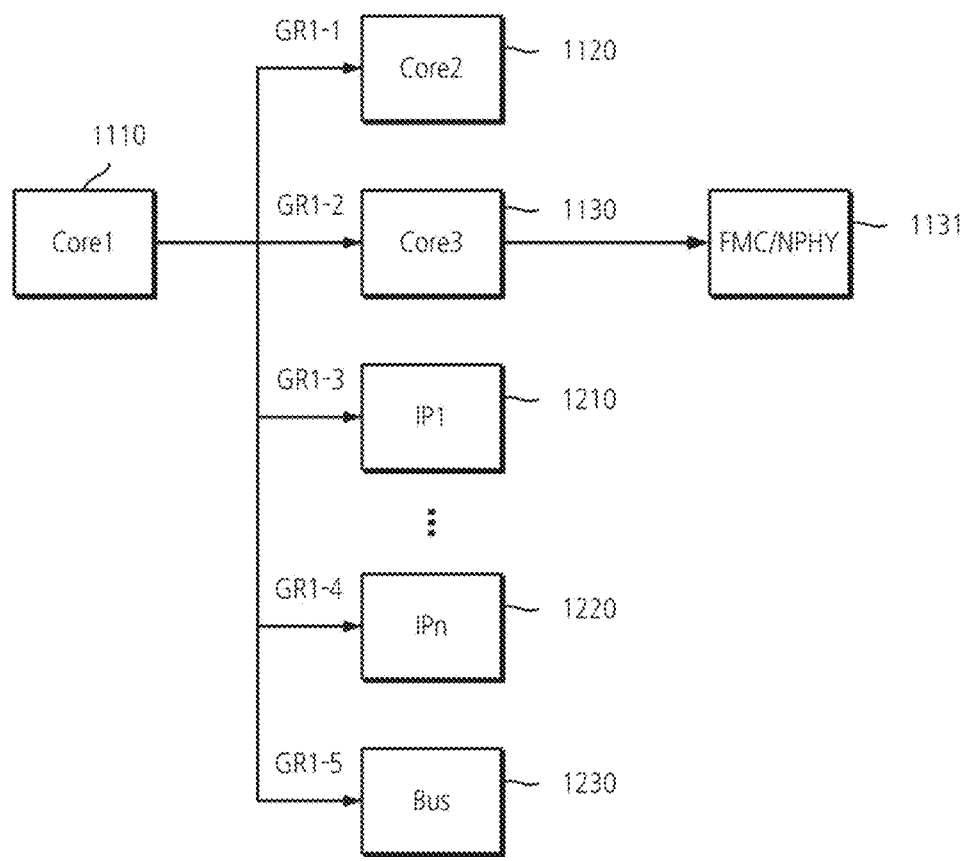
FIGS. 6A and 6B illustrate an operation of a first core according to FIG. 5.
Figure 6B:
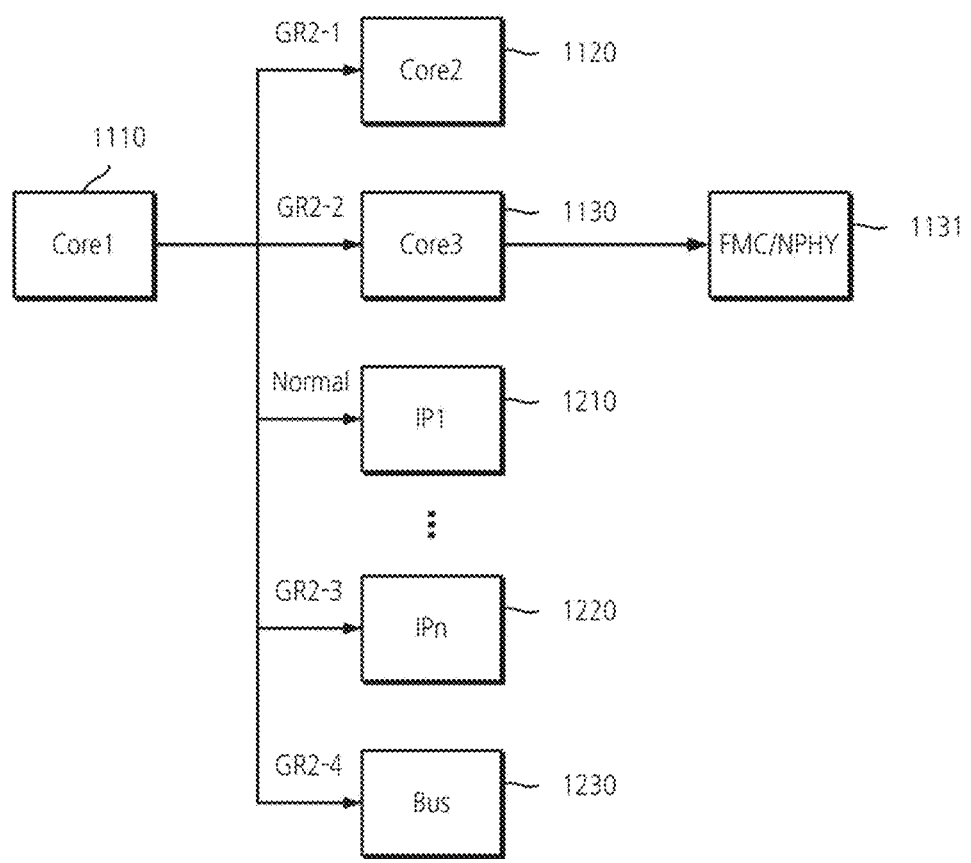

FIGS. 6A and 6B illustrate an operation of a first core according to FIG. 5.

Referring to FIGS. 6A and 6B, the first core 1110 may control one or more cores and one or more Ips according to the predefined (or, alternatively, for example, desired or selected) mapping table 1113 of FIG. 5 as illustrated illustratively. For example, when it is determined that the workload type is type 1, the first core 1110 may generate the clock control signal CC indicating that one or more cores and one or more Ips operate at the 1-1 gear ratio to a 1-5 gear ratio. The third core 1130 that controls the non-volatile memory 1200 operates at the 1-2 gear ratio, and for example, may control configurations related to the operation clock of the non-volatile memory 1200 such as a flash memory controller (FMC)/NAND physical layer (NPHY) 1131.

Alternatively, when it is determined that the workload type is type 2, the first core 1110 may generate the clock control signal CC indicating that each of the one or more cores and each of the one or more Ips operate at a 2-1 gear ratio to a 2-4 gear ratio. In addition, the first core 1110 may exceptionally allow some Ips (for example, the first IP 1210) defined as the normal clock in the predefined (or, alternatively, for example, desired or selected) mapping table 1113 to operate according to the normal clock.

FIG. 7 is a diagram for describing an operation of a storage device, according to some example embodiments of the present disclosure.

Referring to FIG. 7, in operation S1001, when the host device 10 first transmits the admin command ACMD to the storage controller 1100, the storage controller 1100 may receive the admin command ACMD. For example, the storage controller 1100 may receive the admin command ACMD while operating in the normal power mode corresponding to a normal power P1.

In operation S1002, the storage controller 1100 may determine the workload type of the received admin command ACMD.

In operation S1003, the storage controller 1100 may generate the clock control signal CC corresponding to the determined workload type. For example, the storage controller 1100 may generate the clock control signal CC for each of one or more cores and one or more IPs by referring to the predefined (or, alternatively, for example, desired or selected) mapping table 1113.

In operation S1004, the storage controller 1100 may transmit the clock control signal CC to the clock adjustment circuit 1300.

In operation S1005, the clock adjustment circuit 1300 may adjust the clock gear ratio based on the received clock control signal CC. For example, the clock adjustment circuit 1300 may control one or more cores and one or more IPs according to a gear ratio indicated by the clock control signal CC. As the clock gear ratio is adjusted through operation S1005, the storage device 1000 may enter the idle power mode corresponding to an idle power P2 from the normal power mode. Here, the idle power P2 is a lower level than the normal power P1. Accordingly, the storage device 1000 determines the workload type of the admin command ACMD, and when it is determined that the workload has relatively fewer performance constraints, the storage device 1000 may save power by executing the workload in the idle power mode.

Figure 8:
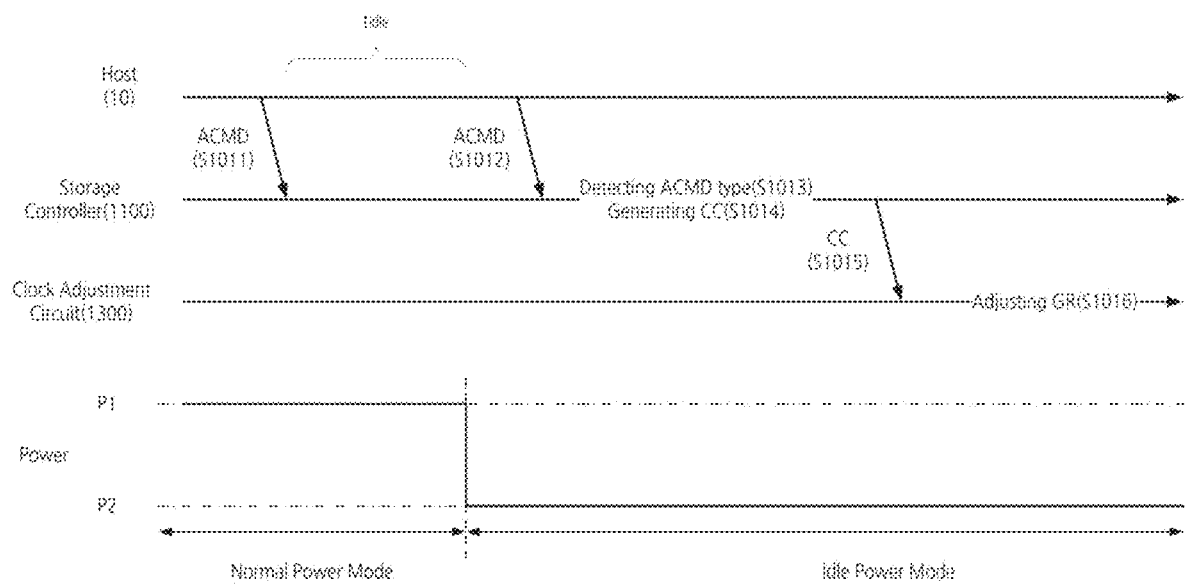
FIG. 8 is a diagram for describing an operation of a storage device, according to some example embodiments of the present disclosure.

FIG. 8 is a diagram for describing an operation of a storage device, according to some example embodiments of the present disclosure.

Referring to FIG. 8, in operation S1011, when the host device 10 first transmits the admin command ACMD to the storage controller 1100, the storage controller 1100 may receive the admin command ACMD. For example, the storage controller 1100 may receive the admin command ACMD while operating in the normal power mode corresponding to the normal power P1.

When the storage device 1000 is set to enter the idle power mode when an input/output command is not received during an idle period $t_{idle}$ according to some example embodiments, the storage device 1000 may enter the idle power mode.

Alternatively, the storage device 1000 may enter the idle power mode by adjusting the clock gear ratio as illustrated in FIG. 7 described above.

In operation S1012, the host device 10 may transmit the additional admin command ACMD after the idle period $t_{idle}$ elapses or, for example, the storage device 1000 enters an idle power mode otherwise, and the storage controller 1100 may receive the additional admin command ACMD in the idle power mode. When the storage device 1000 is set to immediately exit the idle power mode to process commands including the admin command ACMD when the commands including the admin command ACMD are received while operating with idle power, in operation S1012, the storage device 1000 should immediately exit the idle power mode.

However, the storage controller 1100 according to some example embodiments of the present disclosure does not exit immediately upon receiving the additional admin command ACMD during the idle power mode, but determines the workload type of the additional admin command ACMD in operation S1013.

When it is determined that power optimization is possible based on the determined workload type (i.e., when it is determined that operation is sufficiently possible even in the idle power mode), in operation S1014, the storage controller 1100 may generate the clock control signal CC.

In operation S1015, the storage controller 1100 may transmit the clock control signal CC to the clock adjustment circuit 1300.

In operation S1016, the clock adjustment circuit 1300 may adjust the clock gear ratio based on the received clock control signal CC. For example, the clock adjustment circuit 1300 may control one or more cores and one or more IPs according to a gear ratio indicated by the clock control signal CC. As the clock gear ratio is adjusted through operation S1016, the storage device 1000 may continue to operate in the idle power mode. Accordingly, the storage device 1000 determines the workload type of the admin command ACMD, and when it is determined that the workload has relatively less performance constraints, the storage device 1000 may save power by allowing the workload to be operated in the idle power mode without exiting the idle power mode.

Figure 9:
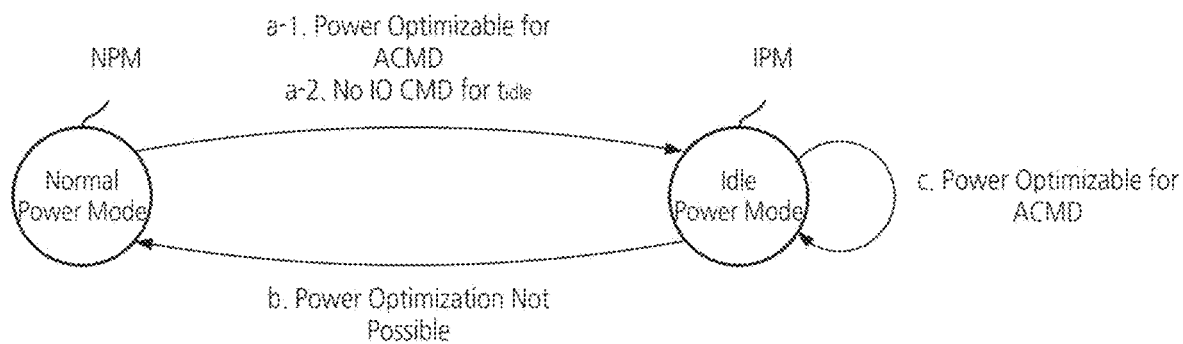
FIG. 9 illustrates states of a storage device, according to some example embodiments of the present disclosure.

FIG. 9 illustrates states of a storage device, according to some example embodiments of the present disclosure.

Referring to FIG. 9, the storage device 1000 may operate in a normal power mode NPM or an idle power mode IPM according to some example embodiments.

In some example embodiments, the storage device 1000 operating in the normal power mode NPM may transition to the idle power mode IPM when it is determined that power optimization with respect to the received admin command ACMD is possible. Transitioning to the idle power mode IPM may include adjusting the gear ratio based on the clock control signal CC.

In some example embodiments, when the storage device 1000 operating in the normal power mode NPM does not receive the input/output command IO CMD during the idle period $t_{idle}$, the storage device 1000 may transition to the idle power mode IPM.

In some example embodiments, when it is determined that power optimization with respect to the received admin command ACMD is impossible, the storage device 1000 operating in the idle power mode IPM may transition to the normal power mode NPM.

In some example embodiments, when it is determined that power optimization with respect to the additional admin command ACMD received in the idle power mode IPM is possible, the storage device 1000 operating in the idle power mode IPM may maintain the idle power mode IPM as it is without entering the normal power mode NPM.

Figure 10:
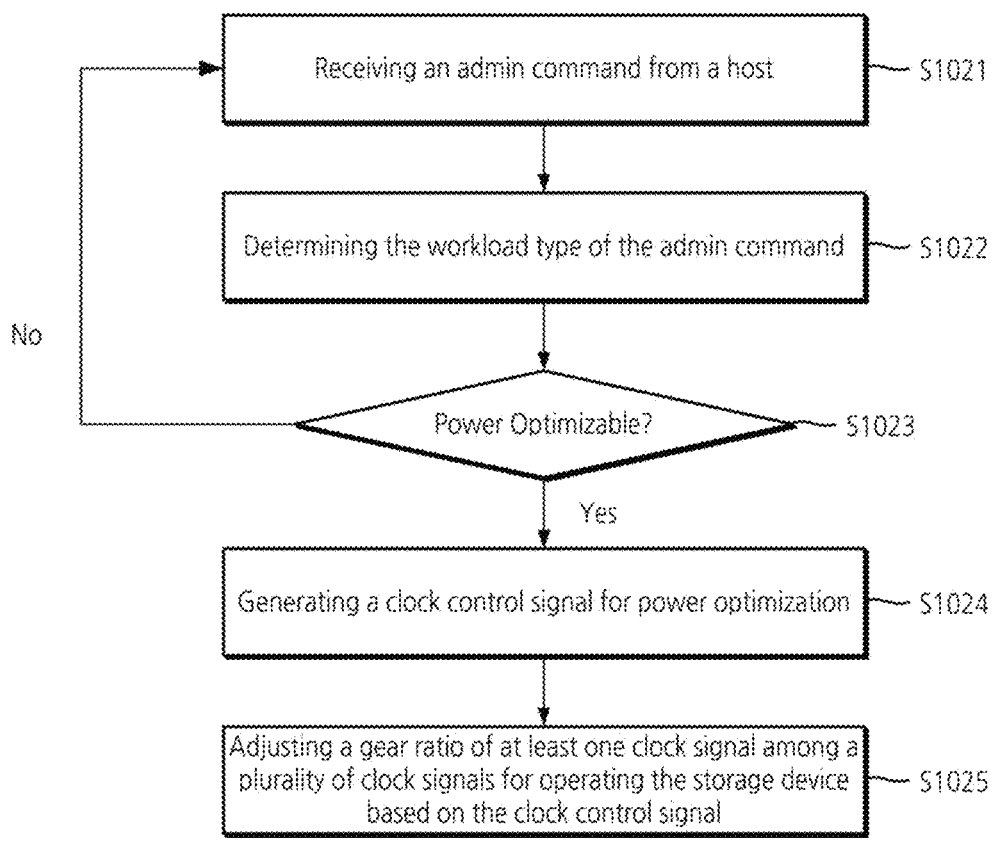
FIG. 10 is a flowchart of an operating method of a storage device, according to some example embodiments of the present disclosure.

FIG. 10 is a flowchart of an operating method of a storage device, according to some example embodiments of the present disclosure.

Referring to FIG. 10, in operation S1021, the storage device 1000 may receive an admin command ACMD from the host device 10.

In operation S1022, the storage device 1000 may determine the workload type of the admin command ACMD.

In operation S1023, the storage device 1000 may determine whether power optimization for operating in the idle power mode is possible with respect to the admin command ACMD based on the workload type. For example, in operation S1023, the storage device 1000 may determine whether operation is possible with the idle power required by the idle power mode with respect to the admin command based on the workload type.

When it is determined that power optimization is possible, in operation S1024, the storage device 1000 may generate the clock control signal CC for power optimization. For example, when it is determined that operation is possible with idle power, the storage device 1000 may generate the clock control signal CC for operating with the idle power.

Alternatively, when it is determined that power optimization is impossible, the storage device 1000 may perform operation S1021 of receiving the admin command ACMD again. Alternatively, or additionally, when it is determined that power optimization is impossible with respect to the admin command ACMD received during operation in the idle power mode, the storage device 1000 may operate in the normal power mode.

In some example embodiments, through operation S1024, the storage device 1000 may generate the clock control signal CC for each one or more cores and one or more Ips included in the storage device 1000.

In operation S1025, the storage device 1000 may adjust a gear ratio of each of at least one clock signal among a plurality of clock signals for operating the storage device 1000 based on the clock control signal CC. Through operation S1025, the storage device 1000 may enter the idle power mode.

Figure 11:
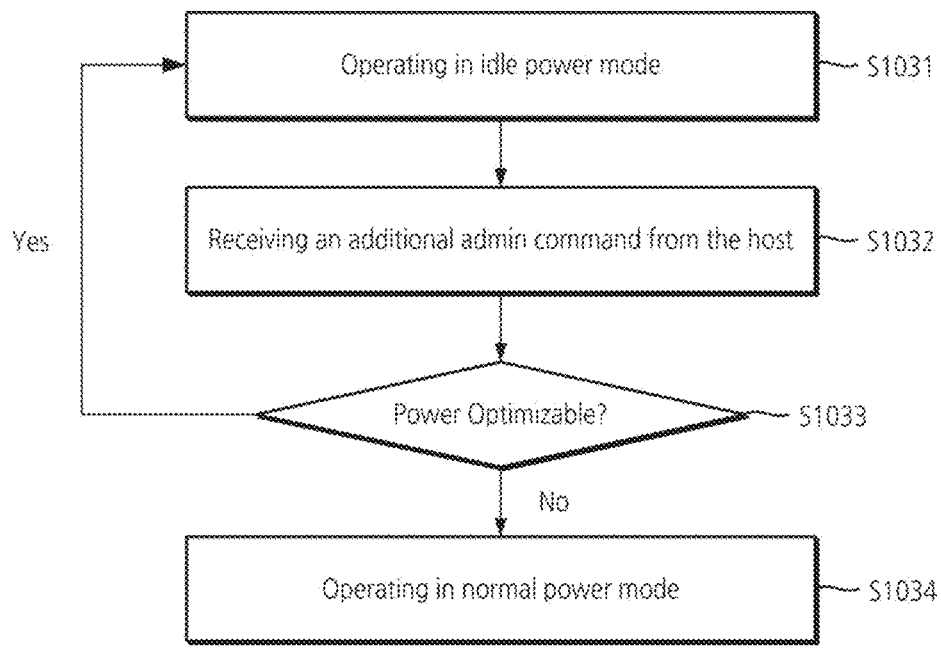
FIG. 11 is a flowchart of an operation for processing an additional admin command of a storage device, according to some example embodiments of the present disclosure.

FIG. 11 is a flowchart of an operation for processing an additional admin command of a storage device, according to some example embodiments of the present disclosure.

Referring to FIG. 11, in operation S1031, the storage device 1000 may operate in the idle power mode. According to some example embodiments, when it is determined that power optimization of a previously received admin command ACMD is possible or when an input/output command is not received during the idle period $t_{idle}$, the storage device 1000 may be operating in the idle power mode.

In operation S1032, the storage device 1000 may receive the additional admin command ACMD from the host device 10 while operating in the idle power mode.

In operation S1033, the storage device 1000 may determine whether power optimization is possible with respect to the additional admin command ACMD. Operation S1033 may include an operation of determining the workload type with respect to the additional admin command ACMD.

In operation S1033, the storage device 1000 may perform again operation S1031 of maintaining the idle power mode when it is determined that power optimization is possible with respect to the additional admin command ACMD.

Alternatively, when the storage device 1000 determines that power optimization is impossible with respect to the additional admin command ACMD in operation S1033, in operation S1034, the storage device 1000 may transition to the normal power mode and may operate in the normal power mode.

Figure 12:
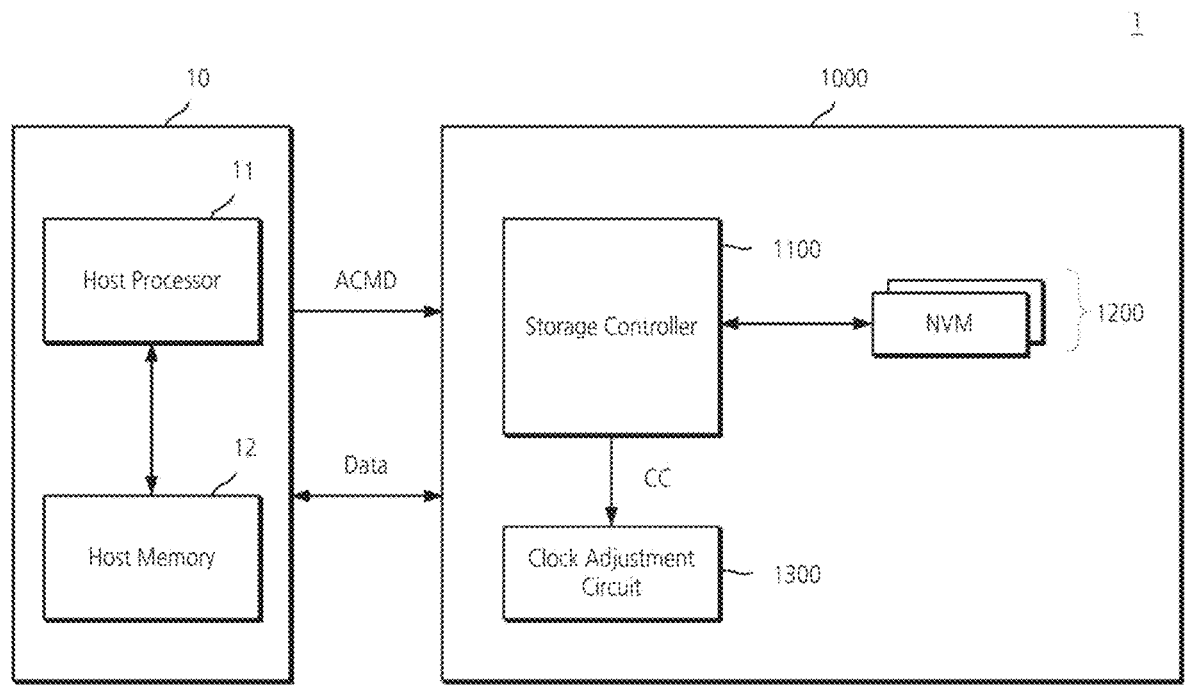
FIG. 12 illustrates a storage system, according to some example embodiments of the present disclosure.

FIG. 12 illustrates a storage system, according to some example embodiments of the present disclosure.

Referring to FIG. 12, a storage system 1 may include the host device 10 and the storage device 1000 according to some example embodiments.

The host device 10 includes a host processor 11 and a host memory 12. The host processor 11 may control an operation of the host device 10. For example, the host processor 11 may execute an operating system (OS) for controlling peripheral devices including the storage devices 1000. For example, the host processor 11 may include any processor such as a central processing unit (CPU).

The host memory 12 may store instructions and data, which are executed and processed by the host processor 11. For example, the host memory 12 may include a volatile memory and/or a non-volatile memory. For example, the host memory 12 may store the management SQ or management CQ with respect to the admin command ACMD described above.

The host device 10 may generate and transmit commands including the admin command ACMD to the storage device 1000. For example, the admin command ACMD may be stored in the admin SQ stored in the host memory 12 and then may be retrieved to the storage device 1000.

The storage device 1000 may be accessed by the host device 10 and may receive various commands including the admin commands ACMD or requests, or other data from the host device 10, or may transmit a response to the commands or the requests, or data stored in a non-volatile memory.

According to some example embodiments, when the admin command ACMD is received from the host device 10, the storage device 1000 may determine the workload type of the admin command ACMD and may generate the clock control signal CC for power optimization, when it is determined that power optimization for operating in the idle power mode is possible with respect to the admin command ACMD based on the workload type. In addition, the storage device 1000 may adjust a gear ratio of each of at least one clock signal among a plurality of clock signals for operating the storage device 1000 based on the generated clock control signal CC.

According to some example embodiments, the storage device 1000 determines the workload type of the admin command ACMD received from the host device 10 while operating in the idle power mode, and when it is determined that operation is possible with the idle power required by the idle power mode with respect to the admin command ACMD based on the workload type, the storage device 1000 may generate the clock control signal CC for operating with the idle power.

According to some example embodiments of the present disclosure, a storage device capable of dynamically operating idle power in consideration of a workload type and an operating method therefor may be provided.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

The above descriptions are specific embodiments for carrying out the present disclosure. Embodiments in which a design is changed simply or which are easily changed may be included in the present disclosure as well as some example embodiments described above. In addition, technologies that are easily changed and implemented by using the above embodiments may be included in the present disclosure. While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A storage device comprising:
a non-volatile memory;
a storage controller connected to the non-volatile memory, configured to operate in an idle power mode or normal power mode,
receive an admin command from a host device while operating in the idle power mode,
determine a workload type of the admin command from workload types, and
generate a clock control signal for operating with an idle power based on a determination that operation is possible with the idle power required by the idle power mode with respect to the admin command based on the workload type; and a clock adjustment circuit configured to adjust a gear ratio of each of at least one clock signal among a plurality of clock signals for operating the storage device based on the clock control signal.

2. The storage device of claim 1, wherein, based on an additional admin command being received from the host device after exiting the idle power mode, the storage controller is configured to enter the idle power mode based on a determination that the operation is possible with the idle power with respect to the additional admin command.

3. The storage device of claim 1, wherein the idle power is smaller than a normal power required by the normal power mode.

4. The storage device of claim 3, wherein the idle power is less than 5 W.

5. The storage device of claim 1, wherein the storage controller is configured to generate the clock control signal based on a mapping table for each of the workload types.

6. The storage device of claim 5, wherein the storage controller is configured to generate the clock control signal for each one or more cores and one or more intellectual properties (IPs) included in the storage device.

7. The storage device of claim 6, wherein the mapping table includes the gear ratio for each of the one or more cores and the one or more IPs for each of the workload types.

8. The storage device of claim 6, wherein at least some of the one or more cores and the one or more IPs are configured to operate with a normal clock according to the workload type operating with the normal clock based on a determination that the at least some of the one or more cores and the one or more IPs are necessary.

9. The storage device of claim 1, wherein the storage controller is configured to determine the workload type based on at least one of a latency required with respect to the admin command, an input/output amount of the non-volatile memory, or a type of the admin command.

10. The storage device of claim 9, wherein the storage controller determines the type of the admin command with reference to an opcode of the admin command.

11. The storage device of claim 9, wherein the storage controller is configured to operate in the normal power mode based on a determination that the operation is impossible with the idle power with respect to the admin command.

12. A storage controller included in a storage device, the storage controller comprising:
a workload type detector configured to determine a workload type, from workload types of an admin command received from a host device while operating in an idle power mode; and
a clock throttling unit configured to
generate a clock control signal for operating with an idle power based on a determination that operation is possible with the idle power required by the idle power mode with respect to the admin command based on the workload type,
determine a gear ratio of each of at least one clock signal among a plurality of clock signals for operating the storage device with reference to a mapping table, and
generate the clock control signal based on the gear ratio.

13. The storage controller of claim 12, wherein the mapping table includes gear ratios for each of the workload types.

14. The storage controller of claim 12, wherein the clock throttling unit is configured to generate the clock control signal for each one or more cores and one or more intellectual properties (IPs) included in the storage device.

15. The storage controller of claim 14, wherein the mapping table includes the gear ratio for each of the one or more cores and the one or more IPs for each of the workload types.

16. The storage controller of claim 12, wherein the workload type detector is configured to determine the workload type based on at least one of a latency required with respect to the admin command, an input/output amount of a non-volatile memory connected to the storage controller, or a type of the admin command.

17. A method of operating a storage device, the method comprising:
receiving an admin command from a host device while operating in an idle power mode;
determining a workload type of the admin command;
determining whether operation is possible with idle power required by the idle power mode with respect to the admin command based on the workload type;
generating a clock control signal for operating with the idle power based on the determination that the operation is possible with the idle power; and adjusting a gear ratio of each of at least one clock signal among a plurality of clock signals for operating the storage device based on the clock control signal.

18. The method of claim 17, further comprising:
receiving an additional admin command from the host device after exiting the idle power mode; and
entering the idle power mode based on the determination that the operation is possible with the idle power with respect to the additional admin command.

19. The method of claim 17, wherein the generating of the clock control signal includes generating the clock control signal for each one or more cores and one or more intellectual properties (IPs) included in the storage device.

20. The method of claim 17, further comprising:
operating in a normal power mode when it is determined that the operation is impossible with the idle power with respect to the admin command.

* * * * *